United States Patent
Christodoulou et al.

(10) Patent No.: US 6,883,038 B2
(45) Date of Patent: Apr. 19, 2005

(54) PRINT DEVICE AND METHOD OF ACQUIRING PRINT DATA WITH A DATA LINK OR NETWORK

(75) Inventors: Athena Christodoulou, Bristol (GB); Richard Taylor, Bristol (GB); Christopher Tofts, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 94 days.

(21) Appl. No.: 10/160,185

(22) Filed: Jun. 4, 2002

(65) Prior Publication Data

US 2002/0181019 A1 Dec. 5, 2002

(30) Foreign Application Priority Data

Jun. 4, 2001 (GB) ............................................. 0113556

(51) Int. Cl.[7] .................................................. G06F 3/00
(52) U.S. Cl. ................. 710/5; 710/6; 710/15; 710/52; 358/118; 718/102; 718/103
(58) Field of Search ........................... 710/5, 6, 15, 52; 358/118; 718/102, 103

(56) References Cited

U.S. PATENT DOCUMENTS

| | | | | |
|---|---|---|---|---|
| 6,031,624 A | * | 2/2000 | Murphy | 358/1.17 |
| 6,115,132 A | * | 9/2000 | Nakatsuma et al. | 358/1.14 |
| 6,418,136 B1 | * | 7/2002 | Naor et al. | 370/347 |
| 6,549,947 B1 | * | 4/2003 | Suzuki | 709/229 |
| 6,587,861 B1 | * | 7/2003 | Wakai et al. | 715/500 |
| 6,594,033 B1 | * | 7/2003 | Kujirai et al. | 358/1.18 |

FOREIGN PATENT DOCUMENTS

| | | |
|---|---|---|
| GB | 2 331 387 A | 5/1999 |
| GB | 2 349 256 A | 10/2000 |

\* cited by examiner

*Primary Examiner*—Jeffrey Gaffin
*Assistant Examiner*—Niketa Patel

(57) ABSTRACT

A network connects plural computer systems to plural printers. A program of each computer system generates data supplied to at least one printer. A print spooler of each computer system stores the print data. Each printer comprises a daemon and local memory. A data control module monitors, via the network, data relating to a print job stored on a computer system and job timing information relating to preferred time for processing the print job. The daemon retrieves a copy of the data when the network becomes available to transfer the data, and stores the print data on the local memory. The retrieval and storage operations occur before the time specified in the job timing information. When the network traffic is low each printer locally stores data that are retrieved and stored prior to the time specified in the job timing information.

31 Claims, 3 Drawing Sheets

PRINT DEVICE AND METHOD OF ACQUIRING PRINT DATA WITH A DATA LINK OR NETWORK

FIELD OF THE INVENTION

This invention relates to a print device for connection to a computer system. The invention also relates to a method of acquiring print data from a computer system.

BACKGROUND OF THE INVENTION

Print devices are commonly used in both domestic and commercial environments to convert print data, generated in a computer system, into hard-copy output. A computer system will generally include one or more application programs, such as a word processor program, from which print data is generated for output to a printer. The print data for a particular print 'job' usually comprises a page description language (PDL) file describing the physical content of the printable area, and a job description language (JDL) file for describing attributes of the print job, such as the type of paper to be used, the number of copies to be made, the type of finishing to be applied (e.g. stapled/laminated) and so on. Once a print job is generated by the application program, the print data for that job is applied to a print spooler for output to a printer.

A typical print device will comprise a raster-image processor (RIP) for converting the PDL into a file representing the graphical output, e.g. the dots to be printed on a page. This processed data is then passed to a print engine (PE) which converts the processed data into the electrical signals required to drive the physical mechanism of the print device, e.g. the drum of a laser printer, or the carriage/ink nozzles of an inkjet printer.

It is becoming increasingly common for a plurality of computer systems to be connected to a plurality of different printers by means of a computer network. In environments where a large number of print jobs are being processed over a period of time, timing information is often specified as part of the print job. This timing information will often represent a preferred time at which the print job should be processed, or perhaps the latest time at which the print job should be processed. In some circumstances, the print job may simply be placed in a queue on the spooler for passing to a printer at the earliest available time. The JDL of each print job may also specify that a particular print device on the network is to be used, e.g. because it is a colour printer or it has the required finisher device.

At the time at which the print job is to be processed, it is passed by the computer system to a print device. However, the problem often arises, particularly in networked systems, that the print job cannot be processed at the preferred time, since the data channel between the computer system and the print device is congested with data relating to other print jobs. Furthermore, where a particular print device is specified with a new print job, if that print device is already being used to print a different job, the new print job will have to wait until the other print job has been completed. This problem is particularly prevalent in commercial environments where print jobs are placed in a schedule. In such situations, network traffic tends to occur in clustered bursts and bottlenecks occur.

SUMMARY OF THE INVENTION

According to a first aspect of the present invention, there is provided a print device for connection to a computer system, the print device comprising: a data control module; and a local memory, the data control module being configured to monitor, via a data link, print data relating to a print job stored on a computer system, the print data including job timing information relating to the preferred time at which the print job is to be processed, the data control module also being configured to retrieve a copy of the print data as soon as the data link becomes available to transfer the print data, and to store the print data on the local memory, the retrieval and storage operations being performed prior to the time specified in the job timing information.

Accordingly, the print device is capable of maintaining a local storage of print data, the print data being retrieved and stored prior to the time specified in the job timing information at a time when the data link between the print device and a computer to which it is connected is capable of allowing the transfer, e.g. in the case of a computer network, when the network traffic is low. It follows that the print job can thereafter be processed as soon as the print device itself is able to do so. Problems arising due to bottlenecks on the computer network are reduced, since the print data will have been pre-fetched to the print device, and will be ready for processing.

The data control module may be further configured to compare the job timing information with a further set of timing information stored on the local memory, the further set of timing information relating to print jobs currently stored on the local memory, and to retrieve a copy of the print data only if the print job can be processed prior to, or generally at, the time specified in the job timing information. The data control module may be further configured to: monitor file size information in the print data stored on the computer system, the file size information relating to the storage capacity required to store the print data; and to compare the file size information with the available storage space of the local memory, the print data being retrieved only if the print data can be stored on the available storage space of the local memory.

The data control module is preferable configured to retrieve print data from the computer system asynchronously.

The print device further may further comprise a RIP for processing retrieved print data prior to it being stored on the local memory. The print device may further comprise a PE for generating printed output from the processed print data stored on the local memory. In this respect, it should be appreciated that the print device may or may not include a PE. Indeed, where the print device includes no such PE, the print device is simply made available on the network for passing the processed data to one or more PE's via the network.

The data control module may be further configured to output an acknowledgement signal in response to print data being outputted to the PE, the acknowledgement signal being made available for sending to the computer system from which the print data was retrieved.

The local memory module is preferable a cache memory module.

According to a second aspect of the invention, there is provided a computer network comprising: one or more computer systems capable of generating print data; and a plurality of print devices a print device for connection to a computer system, each print device being capable of retrieving print data from the or each computer system via a data link and comprising: a data control module; and a local memory, the data control module being configured to monitor, via a data link, print data relating to a print job stored on a computer system, the print data including job timing information relating to the preferred time at which the print job is to be processed, the data control module also being configured to retrieve a copy of the print data as soon as the data link becomes available to transfer the print data, and to store the print data on the local memory, the retrieval and storage operations being performed prior to the time specified in the job timing information.

As a further point, it is possible to locate to data control module external to the or each print device.

According to a third aspect of the invention, there is provided a method of acquiring print data from a computer system, the method comprising: monitoring, by means of a data control module of a print device, print data relating to a print job stored on a computer system, the print data including job timing information relating to the preferred time at which the print job is to be processed; retrieving a copy of the print data as soon as a data link between the data control module and the computer system becomes available to transfer the print data, and storing the print data on a local memory of the print device, the retrieval and storage operations being performed prior to the time specified in the job timing information.

The method may further comprise: comparing the job timing information with a further set of timing information stored on a local memory of the print device, the further set of timing information relating to print jobs currently stored on the local memory; and retrieving the print data from the computer system via the data link only if the print job can be processed prior to, or generally at, the time specified in the job timing information. The print data may further include file size information relating to the storage capacity required to store the print data, the step of retrieving the print data from the computer system further comprising comparing the file size information with the available storage space of the local memory, the print data being retrieved only if the print data can be stored on the available storage space of the local memory module.

The method may further comprise: processing the retrieved print data using a RIP prior to storing it on the local memory. The method may further comprise generating printed output from the processed print data stored on the local memory.

An acknowledgement signal can be generated by the data control module in response to printed output being generated from the processed print data, the acknowledgement signal thereafter being sent to the computer system from which the print data was retrieved. The acknowledgement signal can be used to delete a copy of the print data stored in the computer system. Alternatively, the acknowledgement signal can be used to tag the print data to indicate that it has been printed, the tag being used thereafter by the computer system to indicate to further print devices that the print data has already been processed to generate printed output.

According to a fourth aspect of the present invention, there is provided a computer program stored on a computer usable medium, the computer program comprising computer readable instructions for causing a computer system to execute the steps of: monitoring, by means of a data control module of a print device, print data relating to a print job stored on a computer system, the print data including job timing information relating to the preferred time at which the print job is to be processed; retrieving a copy of the print data as soon as a data link between the data control module and the computer system becomes available to transfer the print data, and storing the print data on a local memory of the print device, the retrieval and storage operations being performed prior to the time specified in the job timing information.

BRIEF DESCRIPTION OF THE DRAWINGS

The invention will now be described, by way of example, with reference to the accompanying drawings in which.

DETAILED DESCRIPTION OF THE PREFERRED EMBODIMENT

Figure 1:
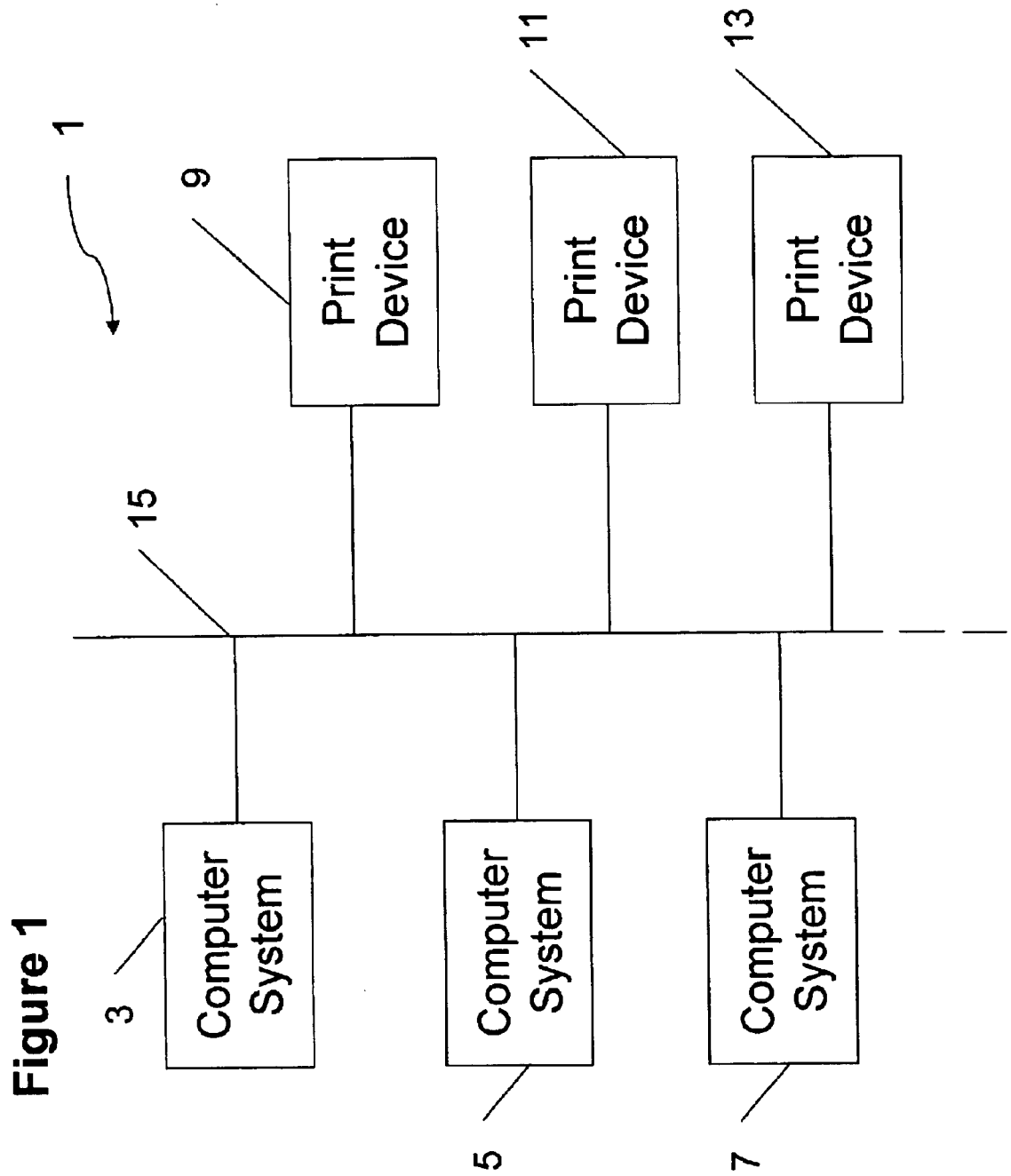
FIG. 1 is a block diagram representation of a computer network.

Referring to FIG. 1, a computer network 1 comprises first, second and third computer systems 3, 5, 7 connected to first, second and third print devices 9, 11, 13 by means of a network 15. Each computer system 3, 5, 7 comprises at least one application program capable of generating print data for output to one or more of the print devices 9, 11, 13. The print data is output from each application program and stored in a print spooler (not shown) forming part of each computer system 3, 5, 7. The first and second print devices 9, 11 are general-purpose print devices, whilst the third print device 13 includes a special finishing device, namely an automatic stapler (not shown).

Figure 2:
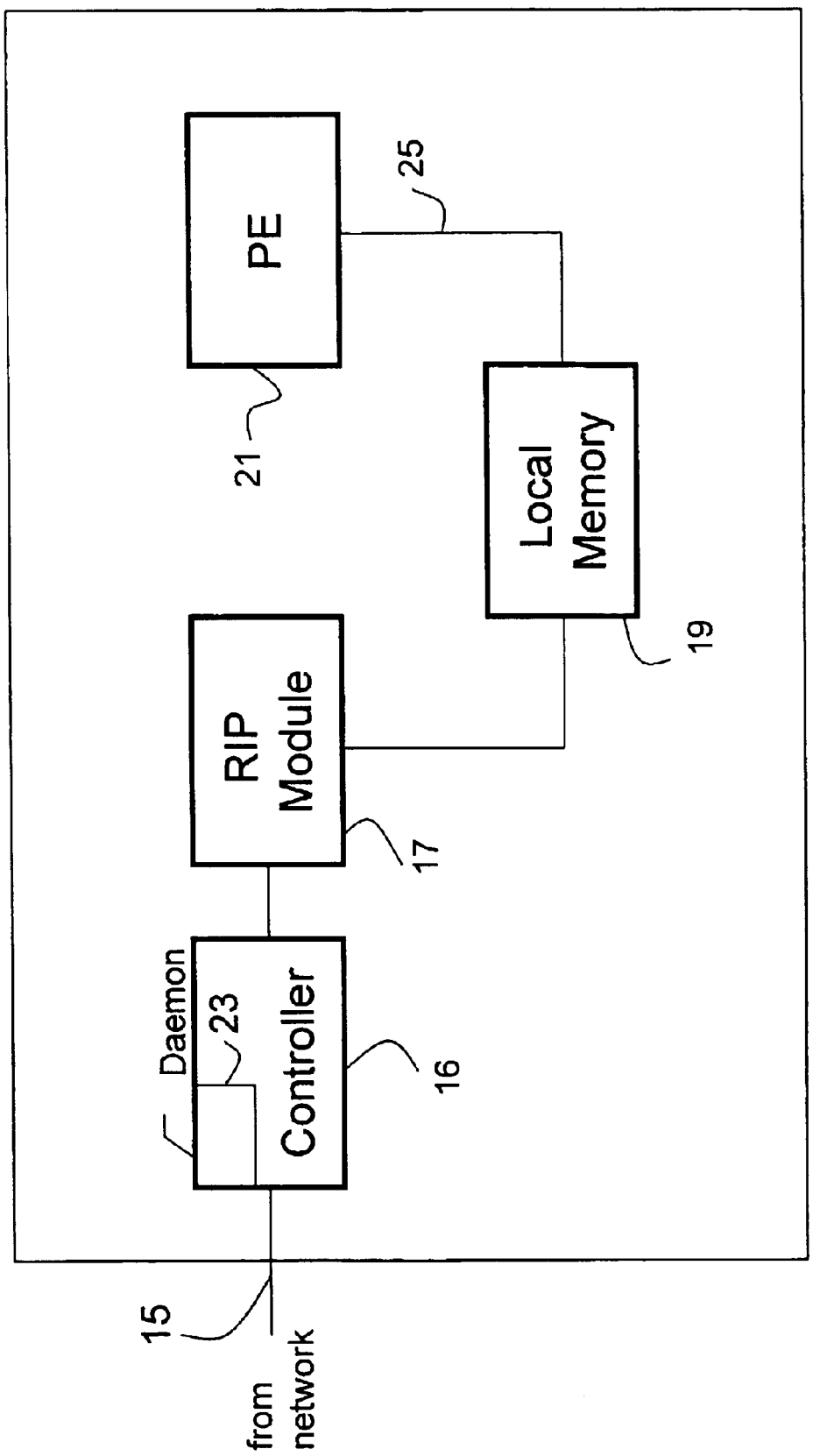
FIG. 2 is a block diagram representation of a print device used in the computer network of FIG. 1.

Referring now to the block diagram of FIG. 2, each of the first, second and third print devices 9, 11, 13 comprises a controller 16, a RIP module 17, a local cache memory 19, and a PE 21. The controller 16 comprises a daemon 23, the operation of which is described below.

In use, each of the computer systems 3, 5, 7 will generate print jobs, comprising a set of print data, over a period of time. Each print job includes a set of timing information specifying, for example, the latest time at which the print job is to be processed for printing to meet a customers specified requirement. Each print job also includes, as part of its JDL data, information as to the size of the print data for that print job, in other words, the memory capacity required to store the print data for that print job. The JDL data also specifies attributes of the particular print job, including whether or not a particular finishing operation, such as stapling, is required.

The daemon 23 comprises a computer program which is arranged to monitor print data relating to each print job being stored on the print spooler (not shown) of each of the first, second and third computer systems 3, 5, 7. The daemon 23 first determines if the print device with which it is associated is suitable for printing the print job currently being monitored (referred to here as the "monitored print job"). So, for example, if the monitored print job is generated from the first computer system 3 and the JDL data for that print job specifies that the output should be stapled, then the daemon 23 of the first and second print devices 9, 11 will determine that they are not able to perform the required print operation, and so will proceed to monitor the next print job on the print spooler.

In the next step, the daemon 23 determines whether the monitored print job can be performed by that print device before, or generally at, the time specified in the timing information of the print job. This is effected by the daemon 23 performing a comparison of the timing information with a list of further timing information associated with print jobs already stored in the local memory 19 of its respective print device 9, 11, 13. This list of further timing information effectively comprises a schedule of print jobs which that print device intends to print in the future. If the daemon 23 determines that, on the basis of the current comparison, it will not be possible to print the current print job at the specified time since its schedule is completely full prior to that time, it will proceed to monitor further print jobs on the relevant print spooler.

If the daemon 23 determines that it will be possible for the monitored print job to be processed prior to, or generally at, the time specified in its timing information (on the basis of the state of its current list of stored timing information), a further test is applied whereby it is determined whether the print data can be stored on the available disk space of the local memory 19. This is performed using the JDL data, as mentioned above. Provided there is sufficient space on the local memory 19, the daemon 23 commences a retrieval process in which a copy of the print data for the monitored print job is copied from the relevant print spooler to the local memory 19. This retrieval process is performed as soon as the network connection 15 becomes available for data transfer, e.g. when the network traffic is low or zero. In the case shown in FIG. 2, the print data is first processed by the RIP module 17 prior to it being stored in the local memory 19, although it will be appreciated that such RIP processing could be performed at a later time. The data is retrieved asynchronously. If the print data is not retrieved and stored in the local memory 19 in its entirety, e.g. due to some error or fault on the network connection 15, then the daemon 23 will invoke a further retrieval attempt, provided the network connection 15 is still free. If not, the daemon 23 will wait until the network connection is free before attempting the further retrieval attempt.

It will be appreciated that, since each of the first, second and third print devices 9, 11, 13 comprises the controller 16 running the daemon 23, it is possible that, over time, print data relating to some print jobs will be copied to the memory 19 of more than one print device. For example, if the JDL of a print job specified that no particular finishing was required for a given print job, the operation described above may well result in the print data for that print job being retrieved and stored onto the local memory 19 of each of the first, second and third print devices 9, 11, 13 (assuming they are each able to print the print job in the time specified by the timing information and that they have sufficient memory space available). Clearly, it will be undesirable for three different copies of the same set of print data to be made. Accordingly, once the print data is processed for printing, the daemon 23 is arranged to send an acknowledgement signal back to the computer system 3, 5, 7 from which the print job was retrieved. This acknowledgement signal can either be used to erase the copy of the print job stored on the relevant print spooler (thus preventing other print devices from acquiring the same print job or informing them that the job has now been processed) or, alternatively, to tag the JDL file for the copy of the print job on the relevant print spooler. This tag can be used to indicate that the print job has been processed, and so it need not be acquired or processed for printing by the daemon 23 of other print devices. The latter method has the advantage that, in the event of a problem in the local memory 19 of the print device which has acquired the print data for the print job, the tag can simply be reversed so that other devices can once again monitor and acquire the print data for that particular print job.

Having acquired and stored print data for a print job in the local memory 19 of one of the first, second or third print devices 9, 11, 13, the print data is made available to a suitable PE 21 for further processing (i.e. printing) as soon as the print device has completed other print jobs which were scheduled to occur before the 'current' print job. This can be done directly from the memory, i.e. by means of the data path 25, shown in FIG. 2, or by means of the controller 16. It should be understood that the inclusion of a PE 21 in each print device 9, 11, 13 is not essential, it being possible to provide a print device simply comprising a controller 16, a RIP module 17 and local memory 19 which can output data to a remote PE 21 somewhere else on the network 15.

Figure 3:
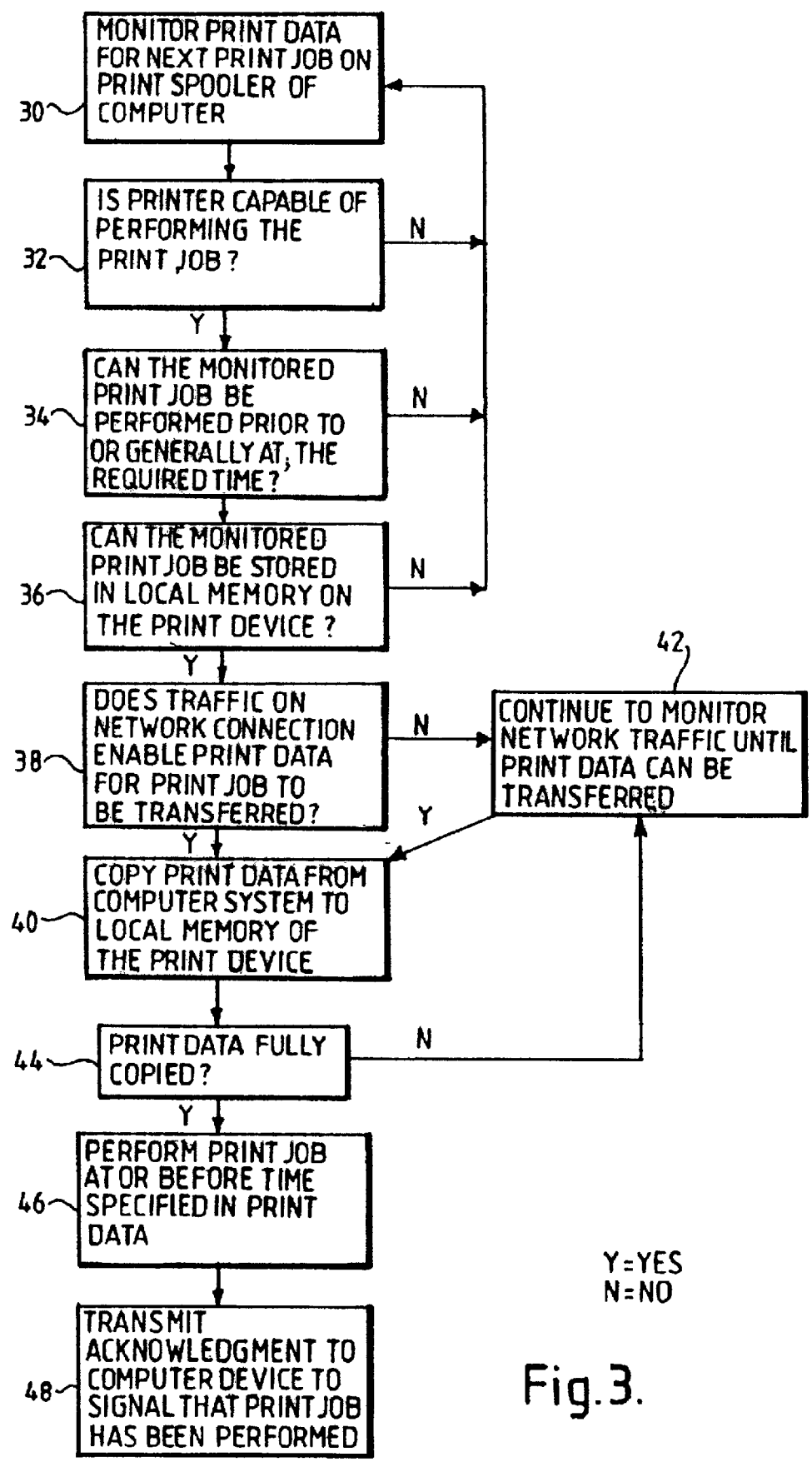
FIG. 3 is a flow diagram showing the steps in a method of print data acquisition.

FIG. 3 is a flow diagram which illustrates the main steps in the print data acquisition method summarised above. The steps of those which are performed by the daemon 23 of each of the first, second, and third print devices 9, 11, 13. The steps of the method described can be embodied in a computer program. For clarity, these main steps once again detailed below.

In a first step 30, the daemon 23 monitors print data relating to a "next" print job which is stored on a print spooler of one of the first, second, and third computer systems 3, 5, 7. In monitoring the next print job, in a next step 32, it is decided whether or not the relevant print device (i.e. that with which the daemon 23 is associated) is capable of performing the monitored print job. As mentioned above, if the JDL data for the monitored print job specifies a particular finishing operation, for example, then in step 32, it has to be determined whether the relevant print device is capable of performing that particular finishing operation. If not, the next print job is monitored again in step 30. If it is so capable, in step 34, it is determined whether the monitored print job can be performed prior to, or generally at, the required time specified in the timing information of the monitored print job.

If the monitored print job cannot be performed prior to, or generally at, the required time, the next print job is again monitored in step 30. If the monitored print job can be performed prior to, or generally at, the required time, then in step 36, it is determined whether or not the monitored print job can be stored in the local memory 19 of the relevant print device. This decision is based on the available storage space on the local memory 19. If sufficient memory is not available, the next print job is again monitored in step 30. If sufficient memory is available, then it is decided in step 38, whether or not the traffic load on the network connection 15 permits the print data of the monitored print job to be transferred to the local memory 19 of the relevant print device. If so, then the print data is copied from the relevant computer system to the local memory of the relevant print device, i.e. in step 40. If not, in step 42, the network traffic continues to be monitored until the print data can be transferred, at which point the print data is copied to the local memory 19 in step 40.

In the next test, i.e. step 44, it is determined whether the print data has been filly copied to the local memory 19 of the relevant print device. In this sense, it will be appreciated that a failing network connection 15 can interrupt a copying process and so step 40 may not be fully completed. If the print data is not fully copied, step 42 is performed again until the data is filly copied to the local memory 19. Once the print data is fully copied, in step 46, the print job is performed prior to, or generally at, the time specified in the print data. Finally, in step 48, an acknowledgement signal is returned to the relevant computer device from which the monitored print job was taken, for the reasons described above. Step 30 is then repeated for the next print job and the process repeats.

For each stage of the method, if it is determined that a print job has been held up for a predetermined time, e.g. due to an error on the network, an error message is flagged so that an operator can intervene.

It will be appreciated that the current state of network traffic has no bearing on the processing of the current print job, since it has been acquired previously (when network traffic was low or zero) and stored within one of the first, second or third print devices 9, 11, 13. This 'pre-fetching' procedure allows efficient usage of existing network printing systems without requiring the installation of more expensive, faster, networks.

What is claimed is:

1. A print device comprising:
   a print engine;
   a memory; and
   a data control module configured to monitor, via a data link, print data relating to a print job stored on a computer system, the print data including job timing information relating to the preferred time at which the print job is to be processed, the data control module also being configured to:
   monitor traffic load on the data link;
   retrieve, prior to the time specified in the job timing information, a copy of the print data as soon as the data link becomes available to transfer the print data as indicated by the monitored traffic load on the data link;
   store the print data on the local memory;
   perform a print processing operation; and
   establish, subsequent to the performance of the print processing operation and prior to operating the print engine on data generated therefrom, that the print job has not been performed by another print device.

2. A print device according to claim 1, wherein the data control module is further configured to:
   compare the job timing information with a further set of timing information stored on the local memory, the further set of timing information relating to print jobs currently stored on the local memory, and
   retrieve a copy of the print data only if the print job can be processed no later than the time specified in the job timing information.

3. A print device according to claim 2, wherein the data control module is further configured to:
   monitor file size information included as part of print data on a computer system, the file size information relating to the storage capacity required to store the print data; and
   compare the file size information with the available storage space of the local memory, the print data being retrieved only if the print data can be stored on the available storage space of the local memory.

4. A print device according to claim 2, wherein the data control module is configured to retrieve print data from a computer system asynchronously.

5. A print device according to claim 1, wherein the print device further comprises a raster image processor (RIP) for processing retrieved print data prior to its being stored in the local memory, and a first print process includes raster image processing.

6. A print device according to claim 1, wherein the data control module is further configured to output an acknowledgement signal in response to print data being outputted to the print engine, the acknowledgement signal being made available for sending to the computer system from which the print data was retrieved.

7. A print device according to claim 1, wherein the local memory is a cache memory module.

8. A computer network comprising:
   at least one computer system capable of generating print data; and
   a plurality of print devices in accordance with claim 1, each print device being capable of retrieving print data from the at least one computer system via a network connection.

9. A method of acquiring and processing print data from a computer system, the method comprising:
   monitoring print data relating to a print job stored on a computer system, the print data including job timing information relating to the preferred time at which the print job is to be processed;
   monitoring traffic load on a data link to the computer system;
   retrieving, prior to the time specified in the job timing information, a copy of the print data as soon as the data link becomes available to transfer the print data;
   storing the print data on a local memory of the print device; and
   establishing, subsequent to the performance of the print processing operation and prior to operating the print engine on data generated therefrom, that the print job has not been performed by another print device.

10. A method according to claim 9, further comprising:
    comparing the job timing information with a further set of timing information stored on a local memory of the print device, the further set of timing information relating to print jobs currently stored on the local memory; and
    retrieving the print data from the computer system via the data link only if the print job can be processed no later than the time specified in the job timing information.

11. A method according to claim 10, wherein the print data further includes file size information relating to the storage capacity required to store the print data, and wherein the step of retrieving the print data from the computer system further includes comparing the file size information with the available storage space of the local memory module, the print data being retrieved only if the comparing step indicates the print data can be stored on the available storage space of the local memory module.

12. A method according to claim 9, wherein the print data is retrieved from the computer system asynchronously.

13. A method according to claim 9, further comprising generating a printed document by operating the print engine on the processed print data if the print job has not been performed by another print device.

14. A method according to claim 9, further comprising generating an acknowledgement signal by the data control module in response to printed output being generated from the processed print data, and thereafter sending the acknowledgement signal to the computer system from which the print data was retrieved.

15. A method according to claim 14, further comprising deleting a copy of the print data stored in the computer system by using the acknowledgement signal.

16. A method according to claim 14, further comprising indicating that the print data stored on the computer system has been printed by tagging the print data stored on the computer system using the acknowledgment signal and, thereafter, indicating to further print devices that the print data has already been printed in response to the computer system responding to the tagging of the print data stored on the computer system.

17. The method of claim 9 wherein the monitoring is performed by a data control module of a print device.

18. A computer-usable medium or storage device for storing a computer program having computer-readable instructions for causing a computer system to acquire print data from a computer system, the program causing the computer system to perform the steps of:

monitoring print data relating to a print job stored on a computer system, the print data including job timing information relating to the preferred time at which the print job is to be processed;

monitoring traffic load on a data link to the computer system;

retrieving, prior to the time specified in the job timing information, a copy of the print data as soon as the data link becomes available to transfer the print data;

storing the print data on a local memory of the print device; and establishing, subsequent to the performance of the print processing operation and prior to operating the print engine on data generated therefrom, that the print job has not been performed by another print device.

19. The computer program of claim 18 wherein the monitoring is performed by a data control module of a print device.

20. A printer having a print engine, a memory and a controller arranged to:

monitor, via a network connection, a print job which has a preferred time for completion and is held on a computer system;

monitor traffic on the network connection;

establish whether traffic load on the network connection permits transfer of the print job to the memory via the network connection, and, if so and the preferred time for completion has not passed, to retrieve the print job and copy it to the memory;

rip data by performing a ripping operation on the data; and establish if the print job has not been performed by another print device; and if not, operate the print engine by using the ripped data to print a document.

21. A printer according to claim 20, wherein the controller is additionally arranged to determine, prior to retrieving the print job, whether the print job has a characteristic requirement which cannot be met.

22. A printer according to claim 21, wherein the characteristic requirement is a particular finishing operation.

23. A printer according to claim 20, wherein the controller is additionally adapted to determine, prior to retrieval, whether, having regard to pending print jobs stored in the memory, it is possible to complete the print job prior to the preferred time for completion.

24. A printer according to claim 20 wherein the controller is additionally arranged to determine, prior to retrieval, whether there is sufficient available space in the memory to store the print job.

25. A printer according to claim 20 wherein the controller is additionally arranged to generate an output signal in response to the print job being sent to the print engine, and to send the output signal to the computer system.

26. A method of acquiring, via a network connection, a print job stored on a computer system and having a preferred time for completion, the method comprising the steps of:

monitoring traffic load on the network connection;

establishing whether the traffic load permits transfer of the print job, via the network connection, to a memory;

deriving ripped data by performing a ripping operation on the data;

establishing if the print job has been performed by another print device; and if not, operating the print engine so it uses the ripped data to print a document.

27. A method according to claim 26 further comprising the step of determining, prior to retrieving the print job, whether the print job has a characteristic requirement which cannot be met.

28. A method according to claim 27, wherein the characteristic requirement is a particular finishing operation.

29. A method according to claim 26, further comprising the step of determining, prior to retrieval, whether, having regard to pending print jobs stored in the memory, it is possible to complete the print job prior by the preferred time for completion.

30. A method according to claim 26 further comprising the step of determining, prior to retrieval, whether there is sufficient available space in the memory to store the print job.

31. A method according to claim 26 further comprising the steps of generating an output signal in response to the print job being sent to a print engine, and sending the output signal to the computer system.

* * * * *